(12) United States Patent
Yamasaki

(10) Patent No.: US 7,286,168 B2
(45) Date of Patent: Oct. 23, 2007

(54) IMAGE PROCESSING APPARATUS AND METHOD FOR ADDING BLUR TO AN IMAGE

(75) Inventor: Ryo Yamasaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 935 days.

(21) Appl. No.: 10/269,935

(22) Filed: Oct. 11, 2002

(65) Prior Publication Data
US 2003/0071905 A1  Apr. 17, 2003

(30) Foreign Application Priority Data
Oct. 12, 2001  (JP) .............. 2001-315671

(51) Int. Cl.
H04N 5/262 (2006.01)
H04N 9/74 (2006.01)

(52) U.S. Cl. ...................... 348/239; 348/578

(58) Field of Classification Search ............ 348/222.1, 348/239, 578, 218.1; 352/85; 382/173, 382/264, 284, 312, 254
See application file for complete search history.

(56) References Cited

U.S. PATENT DOCUMENTS 6,496,598 B1 * 12/2002 Harman ................ 382/154
6,556,784 B2 * 4/2003 Onuki ................... 396/52
6,900,799 B2 * 5/2005 Takeuchi ................ 345/419
6,900,841 B1 * 5/2005 Mihara .................. 348/345
6,952,286 B2 * 10/2005 Luo et al. ............... 358/1.9
2001/0013895 A1 * 8/2001 Aizawa et al. ............ 348/222

FOREIGN PATENT DOCUMENTS

JP  09-181966  7/1997
JP  A 2001-78213  3/2001

* cited by examiner

Primary Examiner—Lin Ye
Assistant Examiner—Justin P Misleh
(74) Attorney, Agent, or Firm—Morgan & Finnegan, LLP

(57) ABSTRACT

This invention has as its object to provide an image processing method which generates an image with a blur effect by an image process as if it were taken by a lens with a large aperture size, and can obtain a higher-resolution image. To this end, the method includes the input step of inputting a first image, and a second image which has parallax with respect to the first image, and the image processing step of executing different image processes for first, corresponding regions of the first and second images input in the input step, and second regions different from the first regions in these images, and compositing the first and second images.

6 Claims, 19 Drawing Sheets

FIG. 14A

|     | -4 | -3 | -2 | -1 | 0  | 1 | 2 | 3 | 4 |
|-----|----|----|----|----|----|---|---|---|---|
| -4  | 0  | 0  | 1  | 1  | 1  | 1 | 1 | 0 | 0 |
| -3  | 0  | 1  | 2  | 4  | 4  | 4 | 2 | 1 | 0 |
| -2  | 1  | 2  | 5  | 6  | 7  | 6 | 5 | 2 | 1 |
| -1  | 1  | 4  | 6  | 8  | 9  | 8 | 6 | 4 | 1 |
| 0   | 1  | 4  | 7  | 9  | 10 | 9 | 7 | 4 | 1 |
| 1   | 1  | 4  | 6  | 8  | 9  | 8 | 6 | 4 | 1 |
| 2   | 1  | 2  | 5  | 6  | 7  | 6 | 5 | 2 | 1 |
| 3   | 0  | 1  | 2  | 4  | 4  | 4 | 2 | 1 | 0 |
| 4   | 0  | 0  | 1  | 1  | 1  | 1 | 1 | 0 | 0 |

FIG. 14B

|     | -4 | -3 | -2 | -1 | 0  | 1 | 2 | 3 | 4 |
|-----|----|----|----|----|----|---|---|---|---|
| -4  | 0  | 0  | 0  | 0  | 0  | 0 | 0 | 0 | 0 |
| -3  | 0  | 0  | 0  | 0  | 0  | 0 | 0 | 0 | 0 |
| -2  | 0  | 0  | 0  | 1  | 1  | 1 | 0 | 0 | 1 |
| -1  | 0  | 0  | 1  | 5  | 7  | 5 | 1 | 0 | 1 |
| 0   | 0  | 0  | 1  | 5  | 10 | 7 | 1 | 0 | 1 |
| 1   | 0  | 0  | 1  | 5  | 7  | 5 | 1 | 0 | 1 |
| 2   | 0  | 0  | 0  | 1  | 1  | 1 | 0 | 0 | 1 |
| 3   | 0  | 0  | 0  | 0  | 0  | 0 | 0 | 0 | 0 |
| 4   | 0  | 0  | 0  | 0  | 0  | 0 | 0 | 0 | 0 |

FIG. 15

| G | B | G | B |
|---|---|---|---|
| R | G | R | G |
| G | B | G | B |
| R | G | R | G |

IMAGE PROCESSING APPARATUS AND METHOD FOR ADDING BLUR TO AN IMAGE

FIELD OF THE INVENTION

The present invention relates to an image processing apparatus and method for adding blur to an image to generate an image with a blur effect, a control program, and a storage medium.

BACKGROUND OF THE INVENTION

As is generally known, the image quality of analog cameras, digital cameras, and the like largely depends on the performance of image sensing lenses. Since the image sensing lens of a camera such as a single-lens reflex camera called a high-end model has a large aperture size, a bright image can be obtained.

Even when the object luminance remains the same, the depth of field can be changed by variously selecting the combinations of apertures and shutter speeds and, as a result, the blur effect of objects other than a principal object can be freely controlled. The high-end model can take appealing photos for such reason.

However, a camera having a lens with a large aperture size becomes large and heavy as a whole since its image sensing lens is large. By contrast, a lens-shutter camera or the like has advantages in a small size and light weight, but its image sensing lens has a small aperture size and a large depth of field. Hence, it is difficult for such compact camera to take an image with a blur effect, which can be taken by a camera with a lens of a large aperture size.

Hence, Japanese Patent Laid-Open No. 9-181966 discloses a method of adding blur by an image process using images taken using a pair of image sensing lenses having parallax. FIG. 19 shows a concept of this conventional image processing method.

Initially, a pair of images A and B having parallax are input. The amount of image deviation of each object in the image is calculated based on these images A and B using a known correlation operation or the like, and the distance to the object is calculated based on the image deviation amount. The amount of blur of each object is calculated based on the distance information, and an image process that reproduces such blur is applied to image A or B. Upon calculating the blur amount, the operator inputs the focal length, f-number, focal point position, and the like of the image sensing lens in advance, and the blur amount is calculated based on such information together with the distance information. In this way, an image with a blur effect like that taken by a lens with a large aperture size can be generated from images taken via the lenses with a small aperture size.

However, in the above prior art, two images A and B are used to calculate the image deviation amount, and an image generated via the image process for adding blur is either image A or B. For example, in case of a digital camera, assuming that image A or B is defined by 640×480 pixels (about 300,000 pixels), an image sensing element having at least 600,000 pixels or two image sensing elements having 300,000 pixels are required to obtain two images A and B. However, the generated image with a blur effect is defined by 300,000 pixels. That is, in order to obtain an image of an arbitrary number of pixels, to which blur is added by the image process, the number of pixels at least twice that of the image to be obtained is required, and the resolution of the obtained image is limited relative to the required cost and space.

Furthermore, upon calculating the image deviation amount (distance) of each object, if an image has a low contrast, the correlation operation of the image deviation amount often results in a calculation error. However, the prior art does not consider any processing operation when such error has occurred. For example, when an object to which blur is not to be added suffers such calculation error, blur is automatically added, and an unnatural image with low image quality is output against operator's intention.

SUMMARY OF THE INVENTION

The present invention has been made in consideration of the above problems, and has as its object to provide an image processing apparatus and method which can generate an image with a blur effect like that is taken by a lens with a large aperture size by an image process, and can obtain an image with higher resolution, a control program, and a storage medium.

In order to solve the above problems and to achieve the above object, an apparatus according to the first aspect of the present invention is characterized by the following arrangement.

That is, an apparatus comprises:
(A) an input device that input a first image, and a second image which has parallax with respect to the first image; and
(B) an image processing device that execute different image processes for first, corresponding regions of the first and second images input by the input device, and second regions thereof different from the first regions, and composite the first and second images.

An apparatus according to the second aspect of the present invention is characterized by the following arrangement.

That is, an apparatus comprises:
(A) an input device that input a first image, and a second image which has parallax with respect to the first image; and
(B) an image processing device that add predetermined blur to at least the first image on the basis of an image deviation amount between the first and second images due to the parallax, the image processing device not adding the predetermined blur when the image deviation amount between the first and second images due to the parallax is not more than a predetermined detection level.

A method according to the first aspect of the present invention is characterized by the following arrangement.

That is, a method comprises:
(A) the input step of inputting a first image, and a second image which has parallax with respect to the first image; and
(B) the image processing step of executing different image processes for first, corresponding regions of the first and second images input in the input step, and second regions thereof different from the first regions, and compositing the first and second images.

A method according to the second aspect of the present invention is characterized by the following arrangement.

That is, a method comprises:
(A) the input step of inputting a first image, and a second image which has parallax with respect to the first image; and (B) the image processing step of adding predetermined blur to at least the first image on the basis of an image deviation amount between the first and second images due to the parallax, the image processing step including the step of not adding the predetermined blur when the image deviation amount between the first and second images due to the parallax is not more than a predetermined detection level.

A control program according to the present invention is characterized by the following arrangement.

That is, a control program makes a computer implement the aforementioned method.

A storage medium according to the present invention is characterized by the following arrangement.

That is, a storage medium computer-readably stores the aforementioned control program.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIGS. 14A and 14B show two different filter matrices used in a blur filter process;

FIG. 15 partially shows a color filter matrix in a Bayer matrix;

DETAILED DESCRIPTION OF THE PREFERRED EMBODIMENTS

Preferred embodiments of the present invention will be described hereinafter with reference to the accompanying drawings.

First Embodiment

Figure 1:
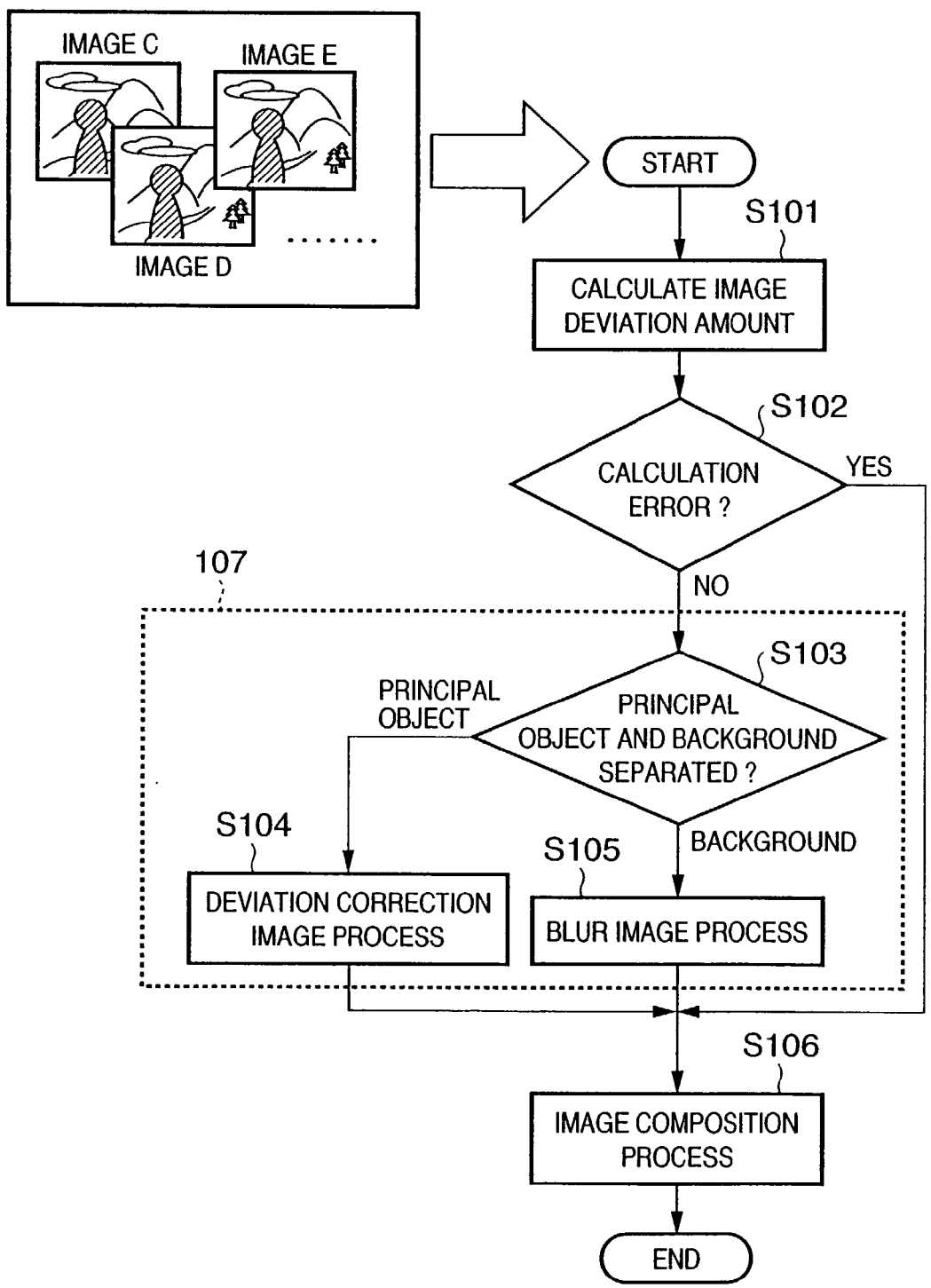
FIG. 1 is a flow chart showing a concept of an image processing method according to an embodiment of the present invention.

FIG. 1 shows a concept of an image processing method according to the first embodiment of the present invention. In FIG. 1, images C, D, E, . . . are a plurality of images having parallax.

In step S101, these plurality of images are input, and image deviation amounts in a plurality of blocks in the images are calculated by a known correlation operation. It is checked in step S102 if any calculation errors of the image deviation amounts in respective blocks are detected. If NO in step S102, the flow advances to step S103; otherwise, the flow jumps to step S106. In step S103, a principal object and background are separated based on the image deviation amounts, and the flow branches to step S104 for a region determined as a principal object in the image sensing frame, or to step S105 for a region determined to be a background. In step S104, a deviation correction image process (to be described later) for correcting the image deviation amounts to a predetermined amount to prevent any image quality drop due to the deviation of image upon image composition in step S106 is executed. On the other hand, a blur image process for adding blur different from that of an image sensing optical system is executed in step S105. Finally, the plurality of images are composited in step S106 to generate a high-resolution image. The flow of the image processing method in this embodiment has been roughly explained. Note that at least two different image processes are executed in the steps bounded by a dotted line 107 in FIG. 1.

An example that implements the aforementioned image processing method will be explained below.

Figure 2:
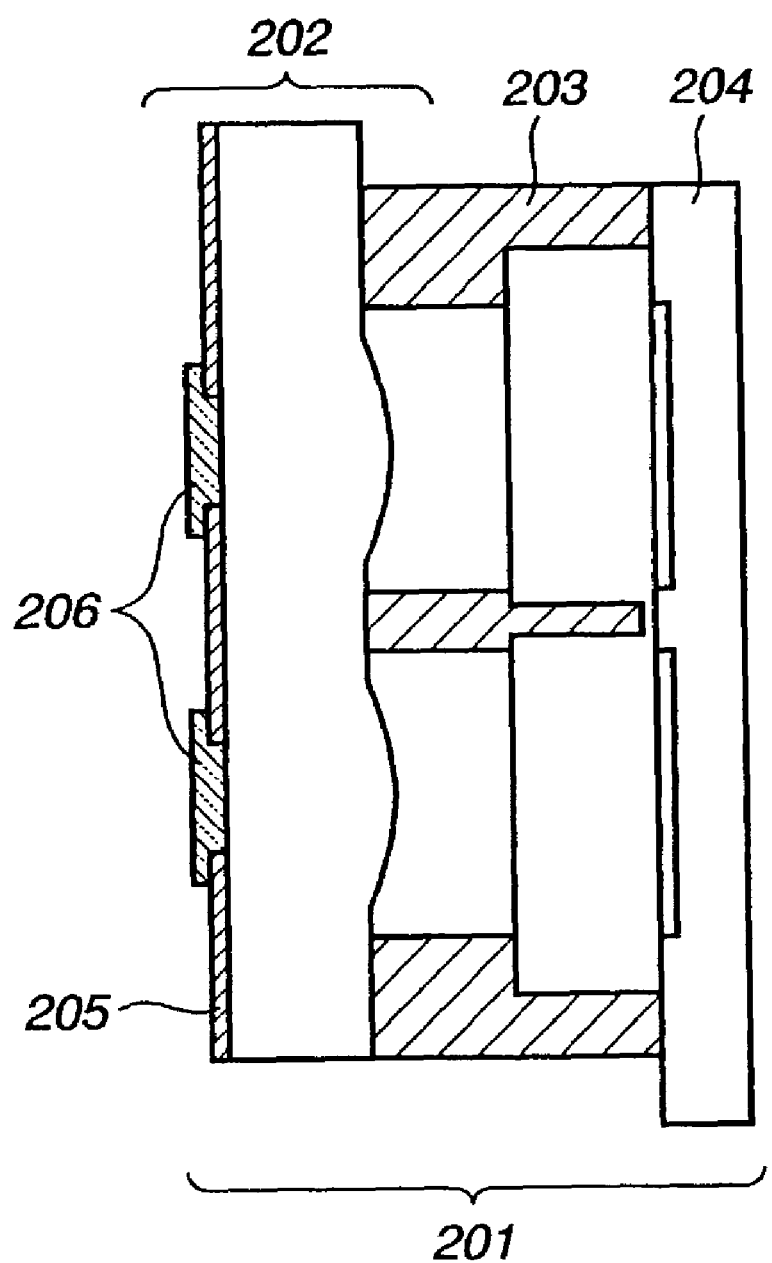
FIG. 2 is a side view of an image sensing unit which takes a plurality of images having parallax.
Figure 3:
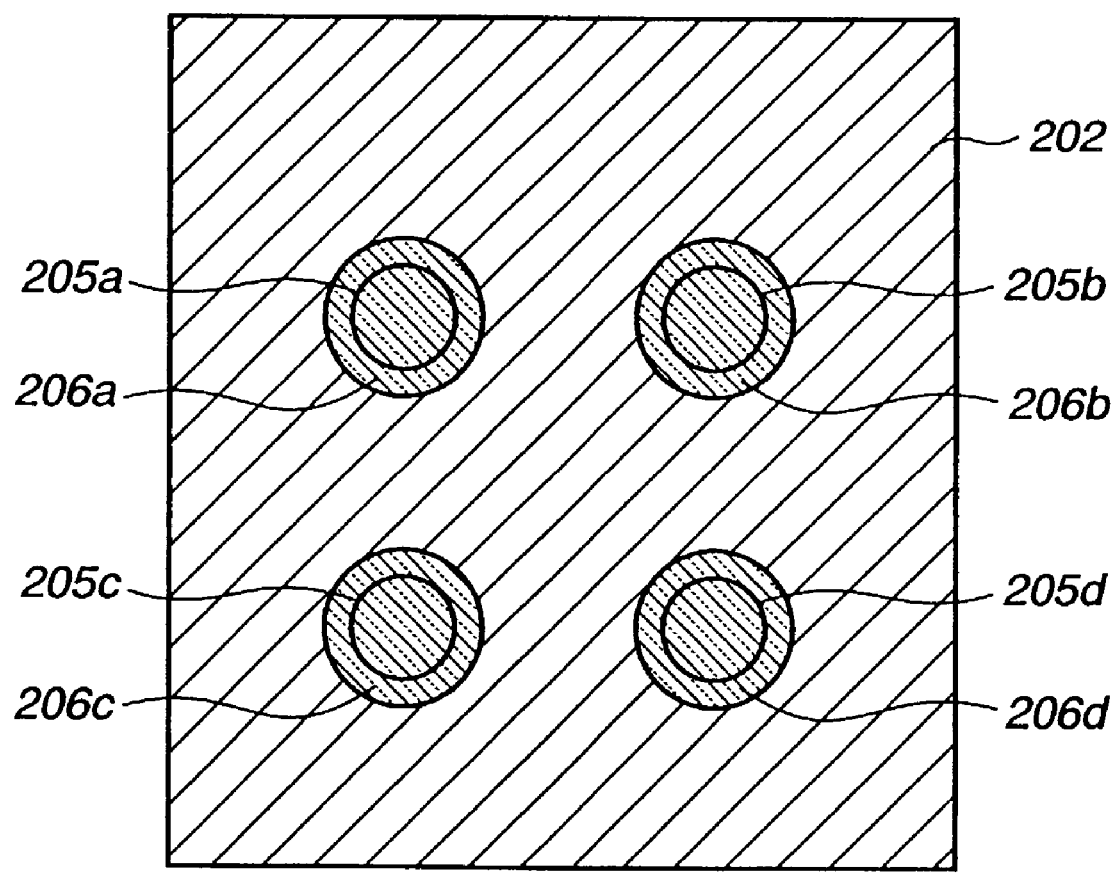
FIG. 3 is a view of an image sensing lens from the entrance surface side.
Figure 4:
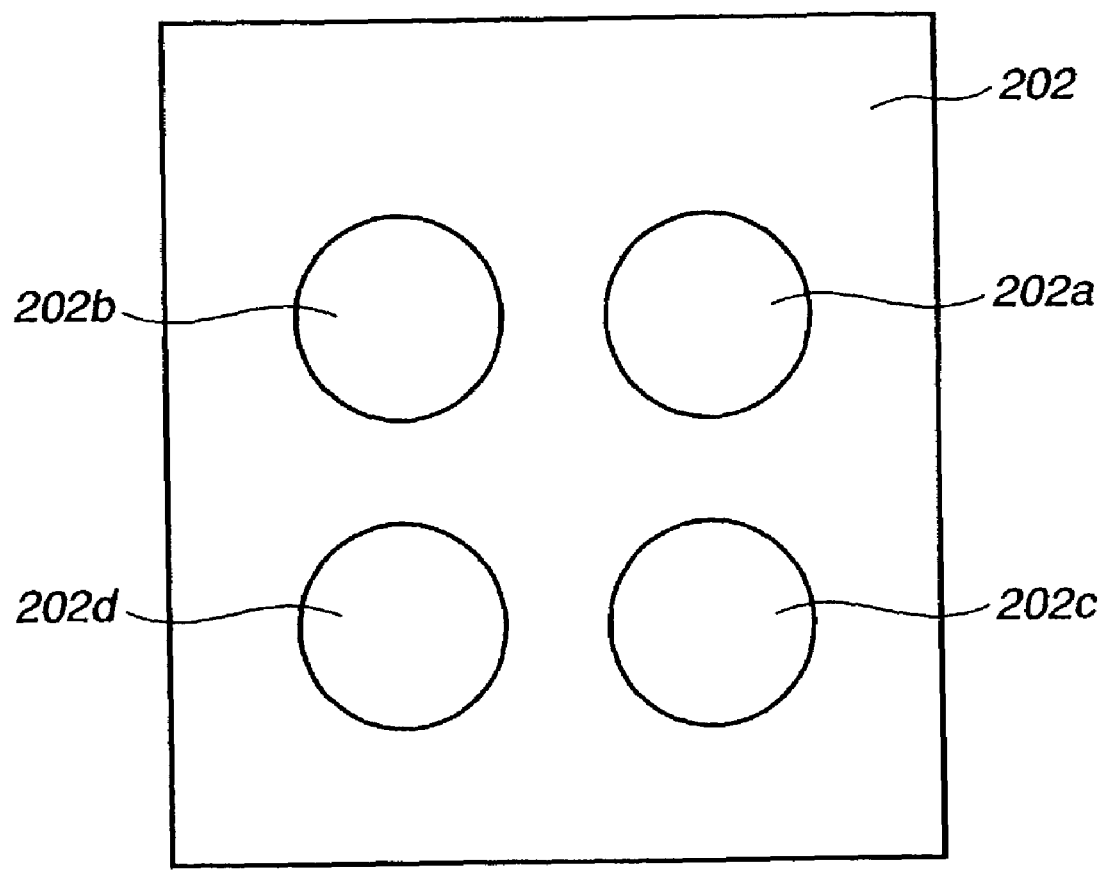
FIG. 4 is a view of the image sensing lens from the exit surface side.

FIGS. 2 to 4 show an image sensing unit of an image sensing device that can take a plurality of images having parallax. This image sensing unit shown in these figures has the same arrangement as that of an image sensing device disclosed in Japanese Patent Laid-Open No. 2001-78213, i.e., has optical systems provided in correspondence with the colors of color filters, and can form an image equivalent to that taken by a single-plate image sensing element with a Bayer matrix by compositing images obtained by the respective optical systems. Since these optical systems are independent from each other, their images have parallax, and the positions of respective optical images, i.e., image deviation amounts change depending on the distance to an object. Also, this image deviation amount is designed to match a ½ pixel at a given predetermined distance, and a so-called pixel shift method that can obtain a high-resolution image using a fewer number of pixels is used. In this embodiment, images obtained by the image sensing device using such image sensing unit undergo an image process.

A detailed arrangement of the image sensing unit will be explained first.

FIG. 2 is a side view of the image sensing unit that takes a plurality of images having parallax. An image sensing unit 201 comprises an image sensing lens 202, housing 203, and image sensing element 204 from the entrance surface side, and has a structure in which the housing 203 is sandwiched between the image sensing lens 202 and image sensing element 204. As shown in FIG. 3, on the entrance surface side of the image sensing lens 202, a stop 205 having apertures 205a and 205c, and color filters 206a and 206c are formed by means of, e.g., printing.

FIGS. 3 and 4 are views of the image sensing lens 202 from the entrance and exit surface sides, respectively. The image sensing lens 202 has four lens portions 202a, 202b, 202c, and 202d, and four apertures 205a, 205b, 205c, and 205d. Four color filters 206a, 206b, 206c, and 206d are formed in correspondence with the four apertures 205a, 205b, 205c, and 205d. Therefore, four optical images are formed on the image sensing element 204. Note that infrared cut filter films having low transmittance to a wavelength range of 670 nm or lower are formed on the lens portions 202a, 202b, 202c, and 202d. The spacing between the lens portions 202a and 202b, that between the lens portions 202a and 202c, and those between the lens portions 202b and 202c, and the lens portion 202d are set to be equal to each other.

Figure 5:
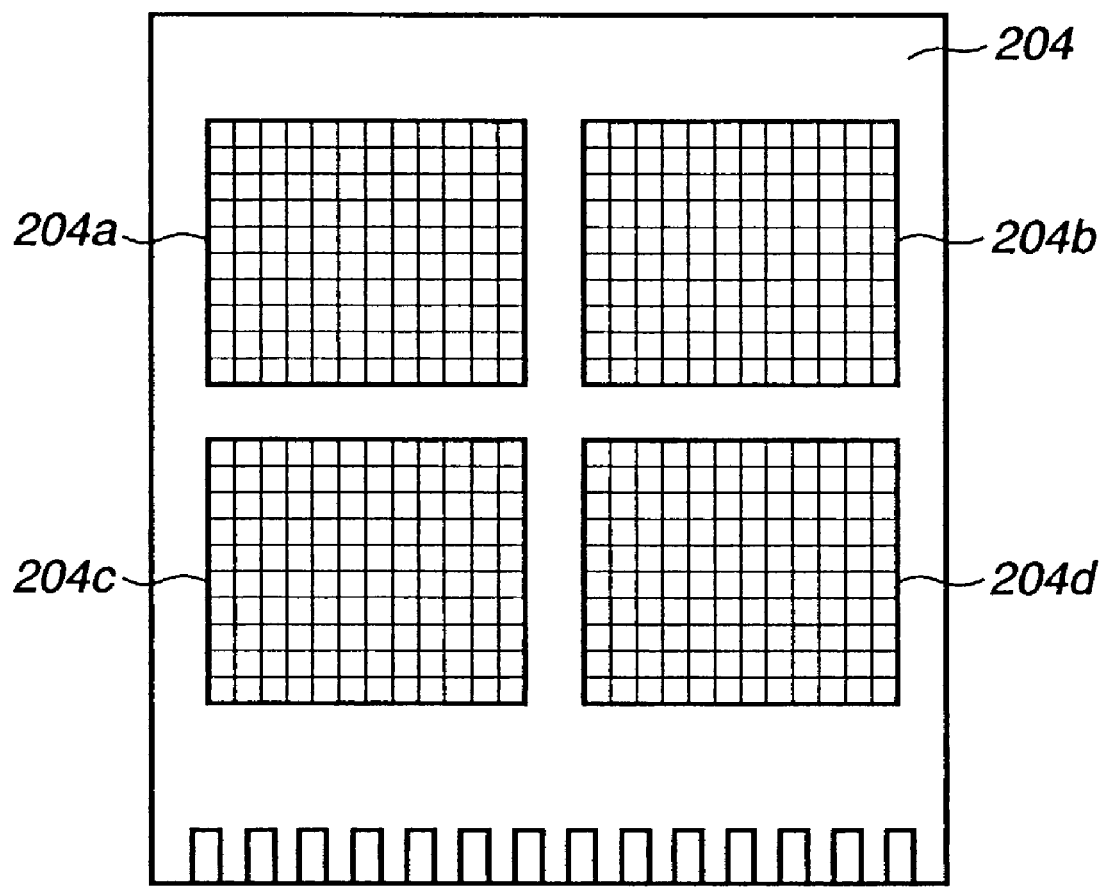
FIG. 5 is a view of an image sensing element from the entrance surface side.

FIG. 5 is a view of the image sensing element 204 from the entrance surface side. The image sensing element 204 has four image sensing regions 204a, 204b, 204c, and 204d in correspondence with the four lens portions 202a, 202b, 202c, and 202d. Note that the image sensing element 204 has a pixel portion as additional pixels in a region other than the four image sensing regions 204a, 204b, 204c, and 204d, and these four image sensing regions are extracted and used upon sensing an image.

Note that the color filters 206a and 206d have spectral transmittance characteristics for mainly transmitting green, the optical filter 206b has spectral transmittance characteristics for mainly transmitting red, and the optical filter 206c has spectral transmittance characteristics for mainly transmitting blue. That is, these filters are primary color filters.

The arrangement of pixel shift, i.e., image deviation due to parallax will be explained below.

Figure 6:
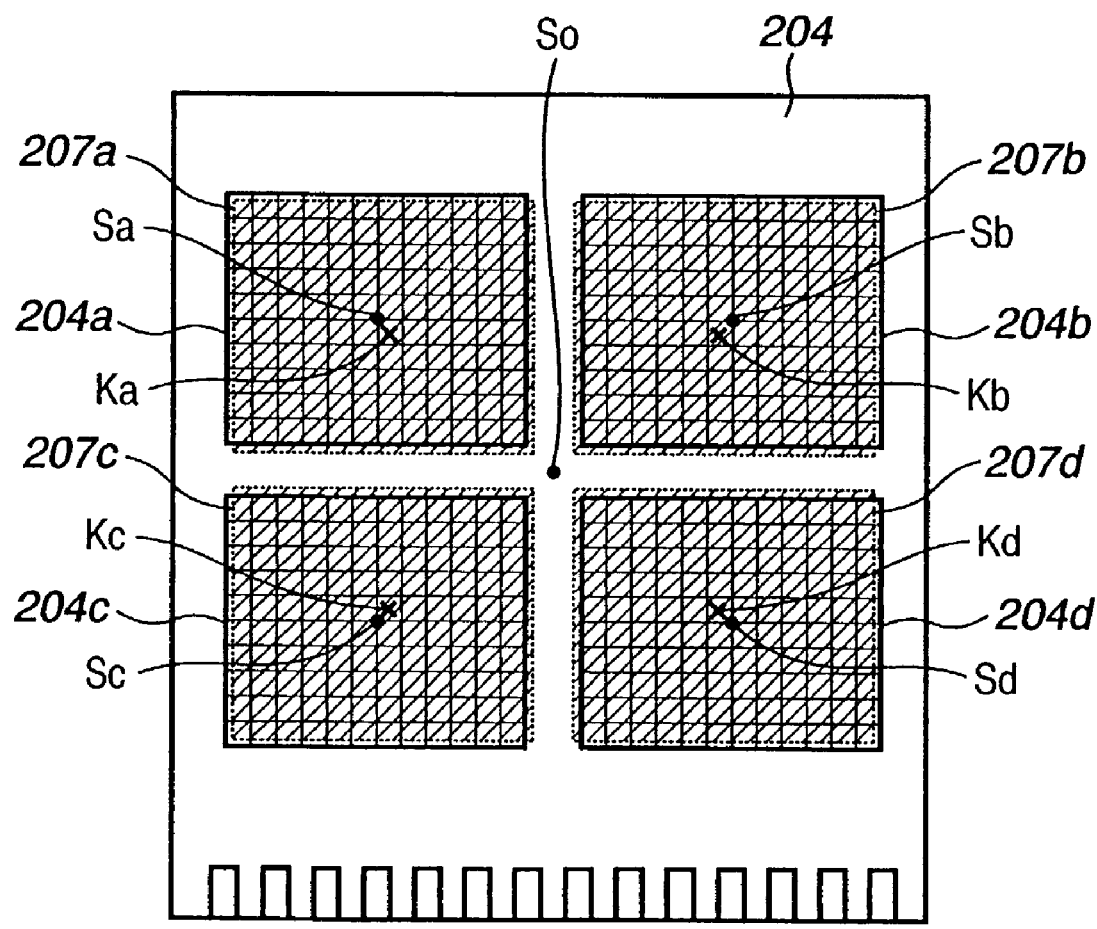
FIG. 6 is a view of the image sensing element from the exit surface side.

FIG. 6 is a view of the image sensing element 202 in FIG. 2 from the entrance surface. In FIG. 6, a point So is the central point of an image sensing element pixel forming portion, and points Sa, Sb, Sc, and Sd are respectively the central points of the image sensing regions 204a, 204b, 204c, and 204d.

Figure 7:
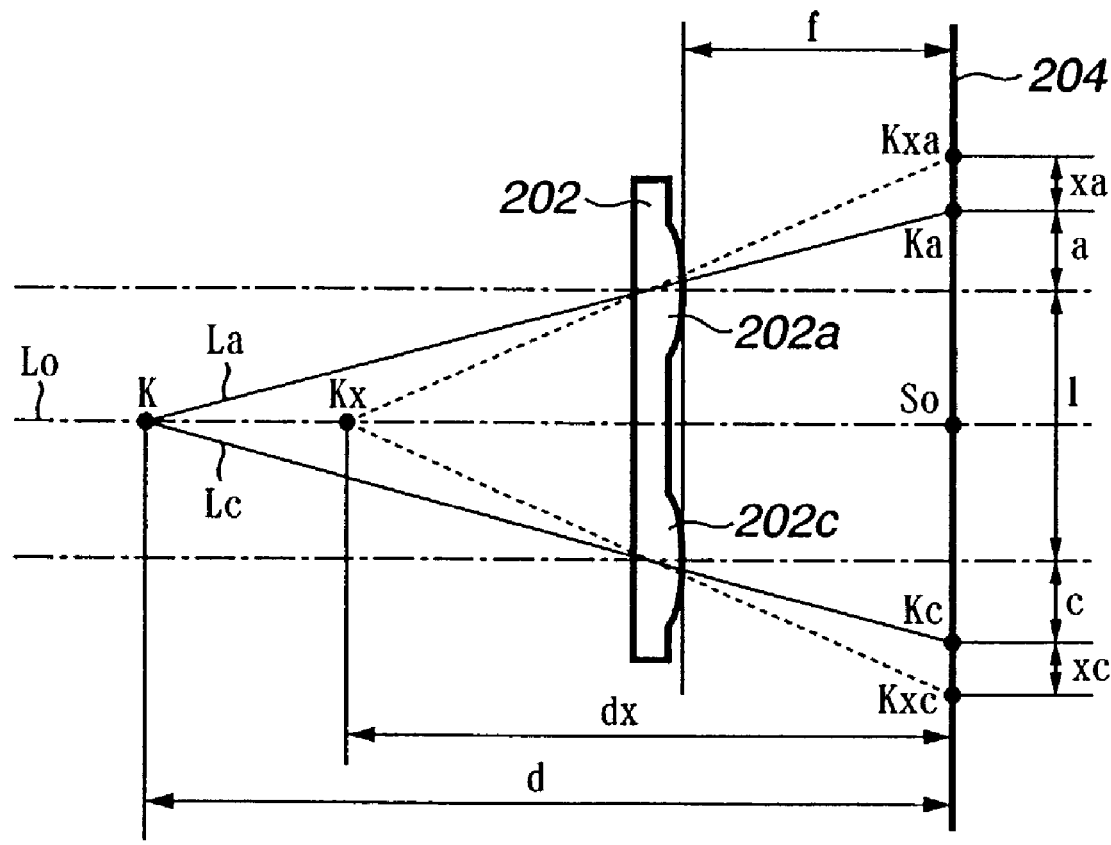
FIG. 7 is a sectional view of an optical system in the image sensing unit so as to explain a change in image deviation amount.

On the other hand, FIG. 7 is a sectional view of an optical system in which only the image sensing lens 202 and the light-receiving surface of the image sensing element 204 of the image sensing unit shown in FIG. 2 are indicated by the bold lines. In FIG. 7, a central line Lo passes through the central point So and is perpendicular to the light-receiving surface 204. A point light source K which is located on this central line Lo and is separated by a distance d will be examined below.

Let La and Lc be the chief rays of light rays which are emitted by the point light source K and pass through the lens portions 202a and 202c of the image sensing lens 202, and Ka and Kc be the intersections with the light-receiving surface of the image sensing element 204. Note that FIG. 7 does not illustrate the lens portions 202b and 202d, but the same concept can apply since they are arranged at symmetrical positions, and a description thereof will be omitted. In FIG. 6, the intersections between chief rays of the lens portions 202a, 202b, 202c, and 202d in association with the point light source K, and the image sensing element 204 are indicated by Ka, Kb, Kc, and Kd. Therefore, if reference numerals 207a, 207b, 207c, and 207d in FIG. 6 respectively denote four optical images formed on the image sensing element 204 upon sensing an object located at the distance d, these optical images are formed to have the points Ka, Kb, Kc, and Kd as the centers.

At this time, the points Ka, Kb, Kc, and Kd are set to deviate a ¼ pixel from the points Sa, Sb, Sc, and Sd toward the central point So. More specifically, the respective image sensing regions 204a, 204b, 204c, and 204d receive optical images which deviate a ½ pixel from each other, and such process is nothing but pixel shift. When the optical images 207a, 207b, 207c, and 207d are composited so that the points Sa, Sb, Sc, and Sd overlap each other, a high-resolution image by means of pixel shift can be obtained. Furthermore, since the aforementioned color filters are provided, the images to be composited are known Bayer matrix images optimal to a color image. The arrangement of pixel shift in this embodiment has been explained.

A case will be examined below wherein the distance d of the point light source K (object) has changed, and the object has moved to a point light source Kx, as shown in FIG. 7. The chief rays of the lens portions 202a and 202c change, as indicated by the dotted lines in FIG. 7, and the intersections between the chief rays and the light-receiving surface of the image sensing element 204 move to points Kxa and Kxc. That is, this demonstrates that the positions of optical images change depending on the distance to an object, i.e., optical images in such case have deviated from those received by the image sensing regions 202a and 202c in a state wherein ½ pixel shift is established. In this embodiment, this deviation is called an image deviation amount. For example, the absolute value of the image deviation amount in ½ pixel shift is 0.5 pixels.

The relationship between the object distance and parallax in this embodiment will be explained below.

In FIG. 7, when the point light source K has moved toward the image sensing lens 202 side, as described above, the spacing between the points Ka and Kc broadens, i.e., the image deviation amount increases. On the other hand, when the point light source K has moved in a direction farther from the image sensing lens 202, the spacing between the points Ka and Kc narrows, i.e., the image deviation amount decreases. Hence, when such change in image deviation amount depending on the distance and the pixel pitch are appropriately set, and the image deviation amount is detected at a plurality of positions in the image sensing frame, an object and background can be easily separated.

Now, we will calculate an image deviation amount in this embodiment in practice. In FIG. 7, let Kx be a point light source at an arbitrary position on the central line Lo, and dx be the distance from the light-receiving surface at that time. Also, a, c, xa, and xc are defined, as shown in FIG. 7, and let l be the spacing between the lens portions 202a and 202c, and f be the distance between the image sensing lens 202 and the light-receiving surface of the image sensing element 204. At this time, "xa+xc" represents an image deviation amount at the distance dx with reference to the image deviation amount at the distance d, and is calculated. From the similar condition of a triangle, we have:

$$dx-f:l=f:a+c+xa+xc \quad (1)$$

$$d-f:l=f:a+c \quad (2)$$

Since the lens portion 202a of the image sensing lens 202 has a green color filter and the lens portion 202c has a red color filter, they have different parallax change sensitivities due to wavelengths. However, since such difference is slight and can be ignored, a and c, and xa and xc are equal to each other. Hence, a, c, xa, and xc are defined as:

$$a=c=P/2, xa=xc=X/2 \quad (3)$$

When equations (1) and (2) substituted with equations (3) are solved for X, an image deviation amount X (i.e., the value of "xa+xc") at an arbitrary distance dx can be calculated as:

$$X=lf/(dx-f)-lf/(d-f) \quad (4)$$

Let Sp be the pixel pitch of the image sensing element 204. Then, by dividing the image deviation amount X by Sp, an image deviation amount for each pixel can be calculated.

Then, we will calculate the relationship between the image deviation amount and distance by setting parameter values on the basis of equation (4) above. Equations (5) below indicate respective parameter values used in this embodiment:

$$f=1.45 \text{ mm}, Sp=3.9 \text{ μm}$$
$$d=2380 \text{ mm}, l=1.4012 \text{ mm} \quad (5)$$

where d is the distance when a ½ pixel shift is established, and is determined based on the field angle of the image sensing lens 202, and the size of an assumed object.

Figure 8:
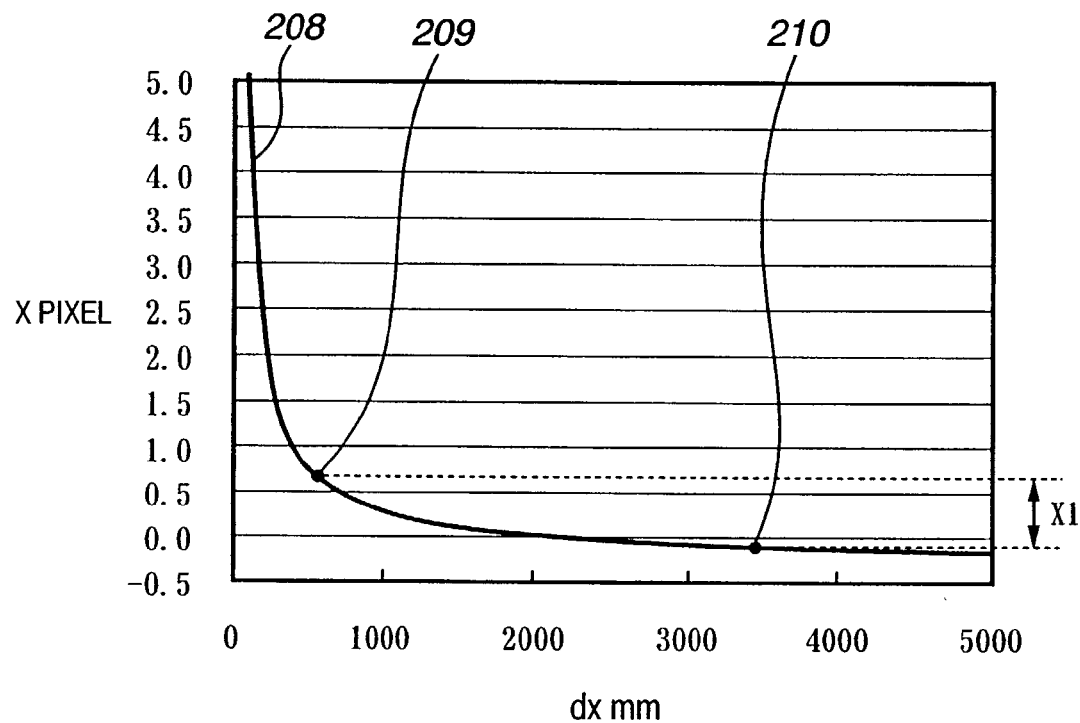
FIG. 8 is a graph showing the relationship between the image deviation amount and distance in the embodiment of the present invention.

FIG. 8 is a graph showing the calculation result of the relationship between the image deviation amount and distance based on equations (4) and (5). The abscissa plots the distance to an object, and the ordinate plots the image deviation amount at that distance (unit=pixels). A curve 208 represents the image deviation amount calculated using equations (4) and (5). In this case, since a relative parallax amount is calculated with reference to the image deviation amount at the distance d, the image deviation amount becomes zero near a distance=2380 mm, but an actual image deviation amount as the absolute value at that distance is −0.5 pixels due to the ½ pixel shift effect.

As can be understood from the curve 208, a change in image deviation amount is large within the range from 0 to 1000 mm, and is small after 1000 mm. Hence, assuming that the principal object is located at a point 209 within the range from 0 to 1000 mm, and the background is located at a point 210 after 1000 mm, the principal object and background can be easily separated as long as a plurality of image deviation amounts in the image sensing frame can be detected, and their difference X1 can be determined.

Note that the image deviation amount at the infinite distance assumes a value obtained when dx in equation (4) is infinity, and is −0.219 pixels if it is calculated using the parameters of equations (5). Such small image deviation amount causes nearly no image quality drop due to pixel shift.

Note that the change in image deviation amount has been explained while focusing on the lens portions 202a and 202c. Since the spacings of the lens portions are set to be equal to each other, the image deviation amounts between the lens portions 202a and 202b, between the lens portions 202b and 202d, and between the lens portions 202c and 202d similarly change. Furthermore, as for the lens portions 202a and 202d, and the lens portions 202b and 202c in the diagonal directions, the change in image deviation amount is the same as that in FIG. 8, since the sensitivities become $\sqrt{2}$ times but the pixel pitch also becomes $\sqrt{2}$ times.

The image processing method using the images obtained by the aforementioned image sensing unit will be explained below. Since the rough flow of the image process has already been explained using FIG. 1, a detailed processing method will be explained.

Figure 9:
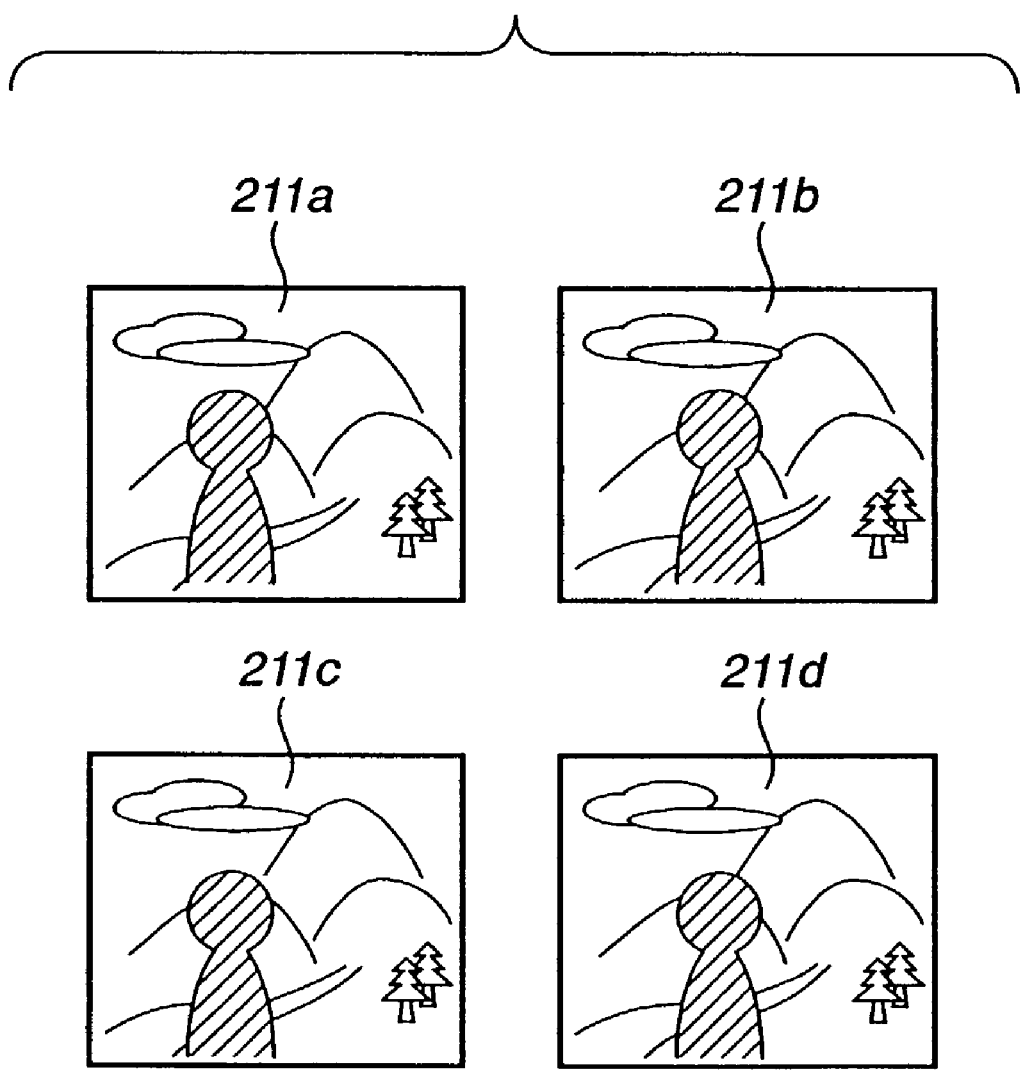
FIG. 9 shows four images having parallax obtained by the image sensing unit.

FIG. 9 shows four parallax images obtained by the aforementioned image sensing unit. Images 211a, 211b, 211c, and 211d respectively correspond to the optical images 207a, 207b, 207c, and 207d on the image sensing element 204 shown in FIG. 6. More specifically, the images 211a and 211d are formed via the green color filters, the image 211b is formed via the blue color filter, and the image 211c is formed via the red color filter. Note that vertically and horizontally inverted images are obtained as actual images by the image sensing lens 202, but FIG. 9 illustrates erected images for the sake of easy understanding. In this embodiment, a parallax amount is calculated using the pair of images 211a and 211d obtained via the green color filters. This is because higher precision can be assured compared to arithmetic operations between different wavelengths, and green in R, G, and B has the highest spatial resolution and can improve the arithmetic precision. In the image process of this embodiment, non-compressed raw image data (quantization image signal of the image sensing element 204) which does not undergo any process is used. In this way, the calculation precision of the image deviation amount can be improved and the processing time can be improved compared to a case wherein the image deviation amount is calculated by a reverse operation from compressed color image data.

Figure 10:
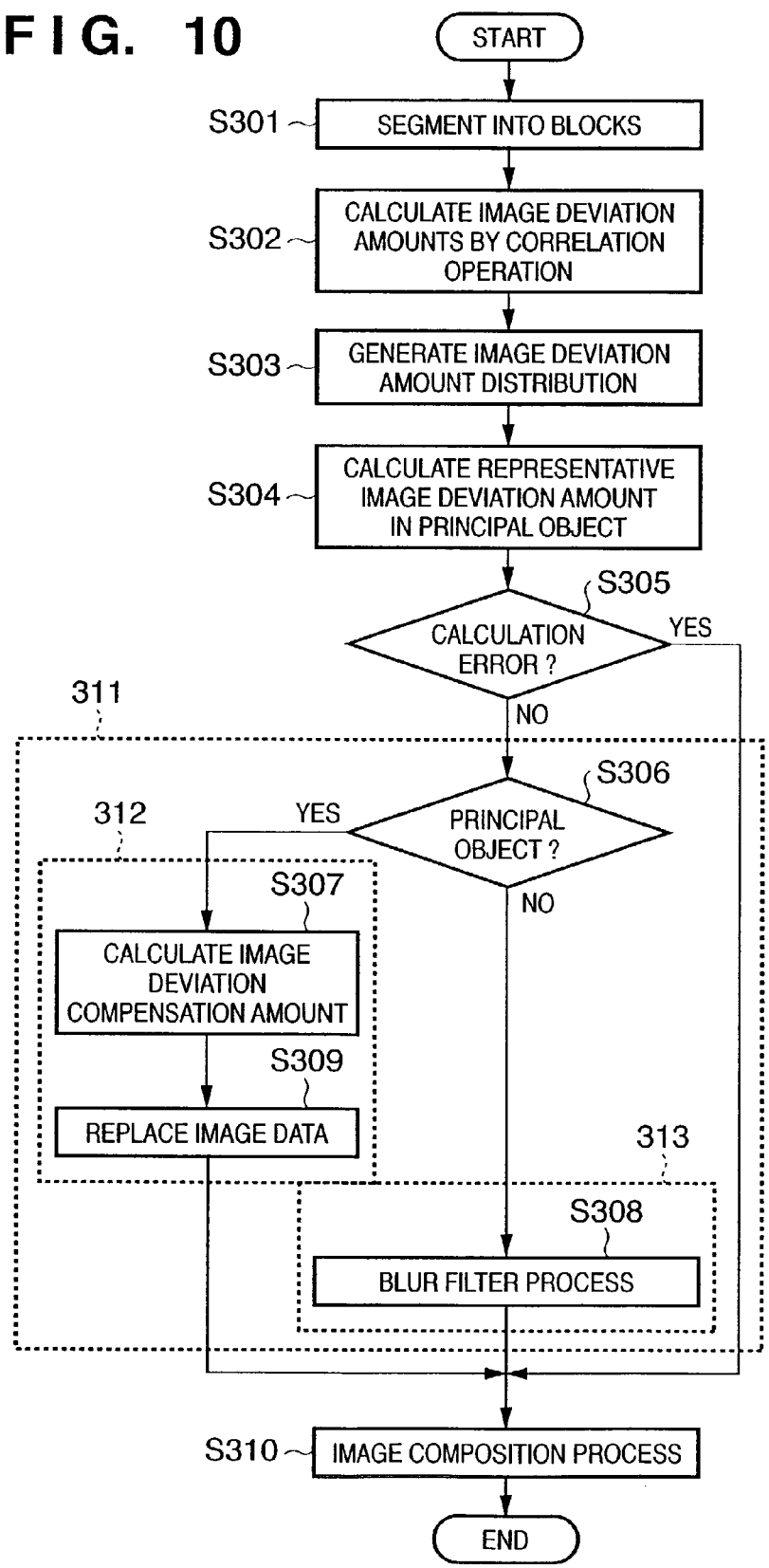
FIG. 10 is a flow chart showing the image processing method of FIG. 1 in more detail.

FIG. 10 is a flow chart that shows the flow chart in FIG. 1 in more detail. A detailed flow will be explained using these flow charts. In FIG. 10, the steps bounded by a dotted line 311 correspond to 107 in FIG. 1. Hence, in the steps bounded by the dotted line 311, at least two different image processes, i.e., a first image process 312 (corresponding to step S104 in FIG. 1), and a second image process 313 (corresponding to step S105 in FIG. 1) are executed.

Figure 11:
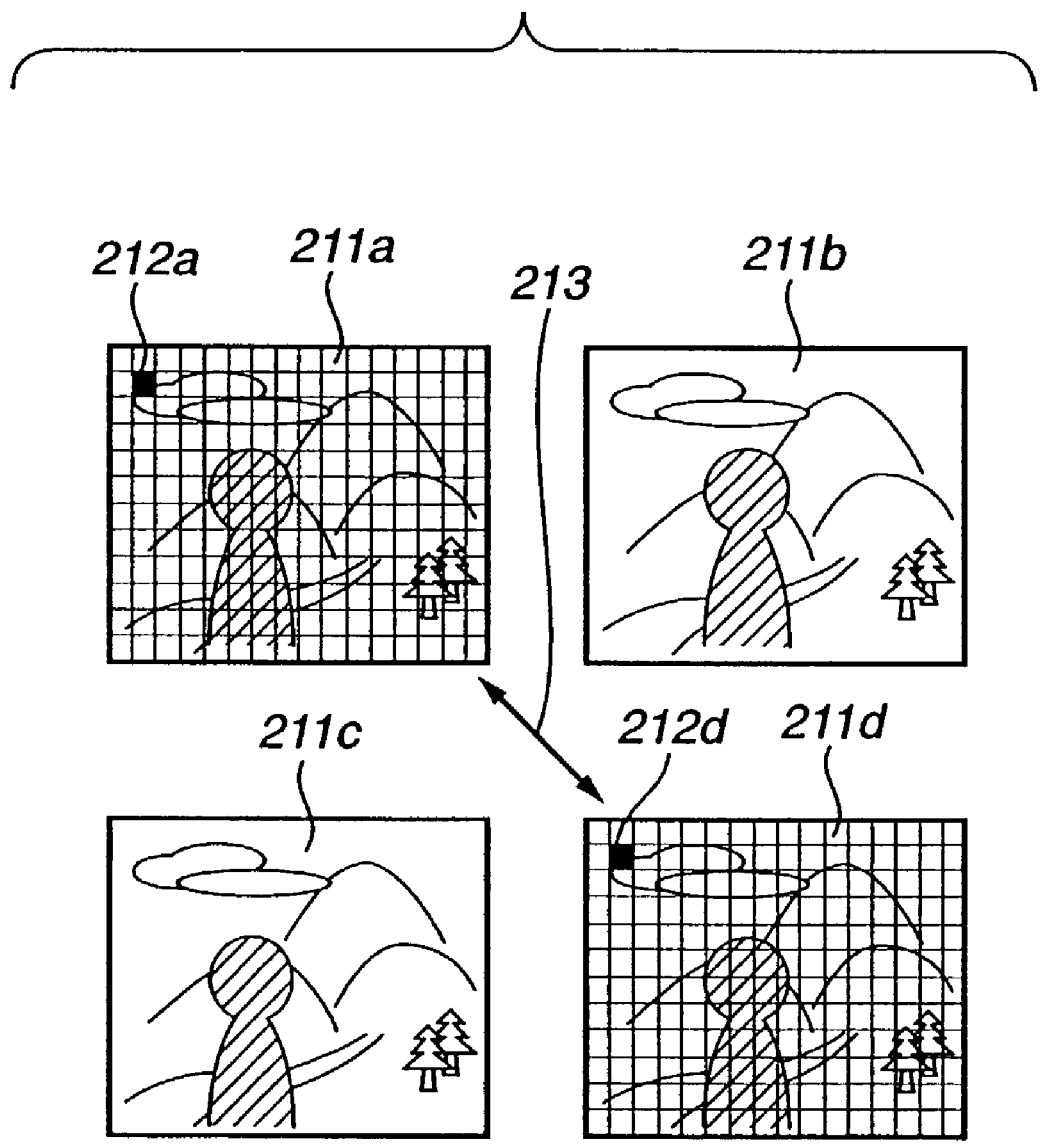
FIG. 11 shows four images having parallax obtained by the image sensing unit to explain block segmentation.

In step S301, four parallax images taken by the image sensing unit 201 are input, and are segmented into a plurality of blocks for respective pixels. FIG. 11 is a view for explaining this block segmentation. As shown in FIG. 11, the images 211a and 211d obtained via the green color filters are segmented into blocks. As the number of pixels per block is smaller, the boundary with the background can become smoother upon separating a principal object. However, if the number of pixels per block is too small, the correlation operation upon calculating the image deviation amount (to be described later) cannot hold. Hence, the number of pixels per block preferably defines a rectangle of 5×5 pixels or more. In this embodiment, each block is a square consisting of 10×10 pixels.

In step S302, the image deviation amounts in respective blocks are calculated using a known correlation operation. For example, focusing attention on a block 212a in the image 211a shown in FIG. 11, one image deviation amount is calculated using image data of a block 212d of the image 211d corresponding to this block 212a. Note that the images 211a and 212d correspond to the optical images 207a and 207d in FIG. 6, and are formed by the lens portions 202a and 202d in FIG. 4. Hence, the moving direction of optical images depending on the distances agrees with a direction indicated by a double-headed arrow 213, and the image deviation amount changes in the direction of this arrow. Since the spacings between the lens portions are set to be equal to each other, the arrow 213 in which the change in image deviation amount takes place has a slope of 45°. The image deviation amount in the direction of the arrow 213 may be detected based on a synthetic vector of parallax amounts calculated in the vertical and horizontal directions. However, in this embodiment, in order to reduce the load on calculations, the image deviation amount in the direction of the arrow 213 is directly calculated by a correlation operation.

In step S303, an image deviation amount distribution is formed based on the calculated image deviation amounts of the blocks. In this case, the image deviation amounts are categorized into two groups. Assuming that a principal object is present within 1000 mm from FIG. 8, a parallax amount at that time is 0.3 pixels or more. Hence, it is checked in this case if the image deviation amount is not less than or less than 0.3 pixels.

Figure 12:
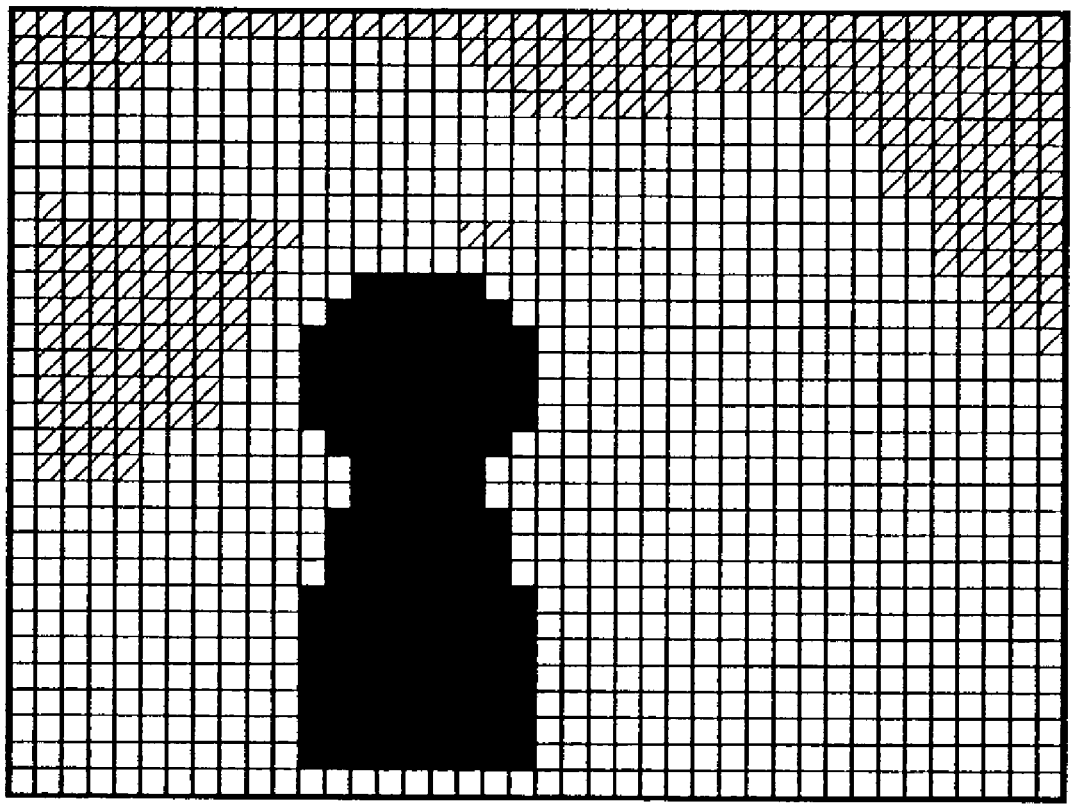
FIG. 12 visually shows the distribution of image deviation amounts on an image segmented into blocks.

FIG. 12 visually illustrates the distribution of image deviation amounts on the image 211a or 211d segmented into blocks. On this distribution image, blocks painted in black indicate image deviation amounts of 0.3 pixels or more, and white blocks indicate image deviation amounts of less than 0.3 pixels. As can be seen from FIG. 12, only a principal object can be separated on the image 211a or 211d. Note that blocks painted in gray indicate those in which image deviation amount calculation errors have occurred, and such errors tend to occur in a low-contrast portion such as sky in the background.

In step S304, one representative image deviation amount in the blocks painted in black in FIG. 12, i.e., in the principal object, is calculated. More specifically, the average value of the image deviation amounts of the plurality of blocks painted in black is calculated, and this value is stored as a representative image deviation amount in the principal object.

It is checked in step S305 if an image deviation amount can be calculated in each block, i.e., if any calculation error is detected. In case of a block in which a calculation error has occurred (gray block in FIG. 12), the flow jumps to step S310; otherwise, the flow advances to step S306.

It is checked in step S306 if each of the blocks without any calculation errors corresponds to the principal object. If it is determined that a given block corresponds to the principal object (black block in FIG. 12), the flow advances to a deviation correction image process in steps S307 and S309; if it is determined that a given block does not correspond to the principal object (white block in FIG. 12), i.e., if it is determined that the block corresponds to a background, the flow advances to a blur filter process in step S308.

In steps S307 and S309, the deviation correction image process for correcting image deviation to a predetermined amount so as to reduce an image quality drop of the principal object upon image composition due to image deviation is executed.

In step S307, an image deviation compensation amount is calculated to nearly remove image quality drop factors such as color misregistration upon image composition. Let Xavg be the representative image deviation amount calculated in step S304 previously. Then, an image deviation compensation amount Xcmp is given by:

$$X\text{cmp} = \{X\text{avg} - (-0.5)\}/2 \quad (6)$$

Note that "0.5" in equation (6) is inserted with reference to the pixel shift amount upon pixel shift. This image deviation compensation amount Xcmp is rounded to an integer in units of pixels, thus facilitating the subsequent processes.

Figure 13:
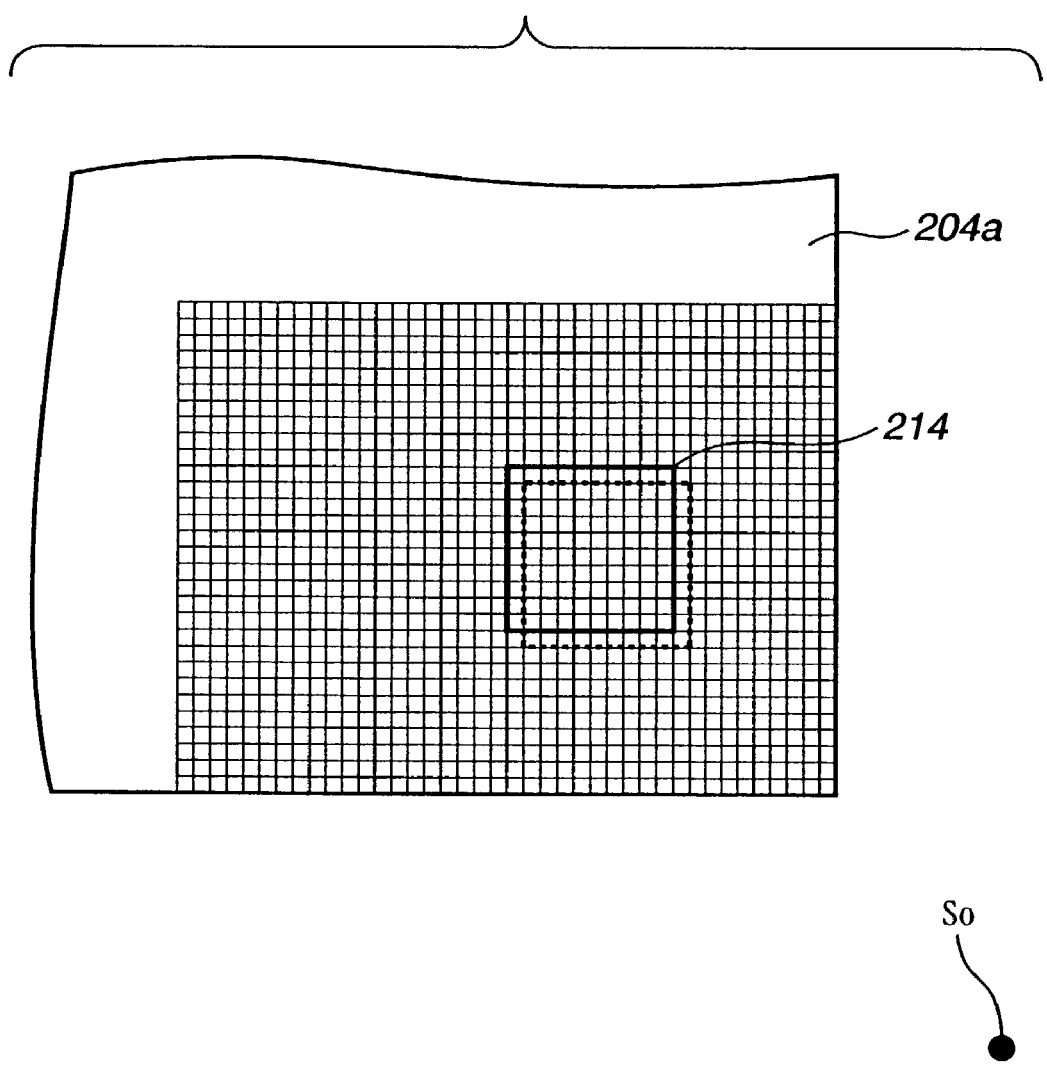
FIG. 13 is a partial enlarged view near the center of the image sensing element to explain replacement of image data.

In step S309, image data are replaced on the basis of the image deviation compensation amount calculated in step S308. FIG. 13 is a view for explaining this process, and illustrates the central point So and a portion near the central point Sa of the image sensing region 204a of the image sensing element 204 shown in FIG. 6 in an enlarged scale.

One region 214 will be examined below. Assume that a value "1.0 pixel" is calculated as the image deviation compensation amount by equation (6). Since the principal object is present on the near distance side, an optical image formed on the image sensing region 204a moves outside the central point So. Therefore, image deviation can be corrected by replacing image data in a region, which is one pixel inside the region 214 toward the central point and is indicated by the dotted line in FIG. 13, as image data of the region 214. Also, in the remaining image sensing regions 204b, 204c, and 204d, image deviation can be corrected by replacing image data with those one pixel inside corresponding regions toward the central point So. All the regions determined to be the principal object undergo the deviation correction process.

In this way, when the image deviation compensation amount is calculated as an integer in units of pixels in step S307, the image data replacement process in step S309 can be implemented by only shifting the regions. Note that the image deviation compensation amount may be calculated as a value including a decimal part, and image data at positions where no pixels are present in practice may be calculated from surrounding image data by interpolation upon replacement. As a result, the pixel shift effect can be fully exhibited. However, since a maximum non-correction amount from an appropriate image deviation amount upon rounding the image deviation compensation amount to an integer is 0.5 pixels, and such value has nearly no influence on an image as color misregistration, this embodiment adopts the above arrangement in consideration of high-speed processes.

The deviation correction image process in steps S307 and S309 has been explained.

On the other hand, in step S308 a region which is determined to be a portion other than the principal object in the image sensing frame, i.e., a background portion undergoes a blur filter process. FIGS. 14A and 14B show 9×9 filter matrices used in the blur filter process, and blur is added by convoluting one of these matrices to respective pixels of an image. The matrix in FIG. 14A indicates a large blur amount, and the matrix in FIG. 14B indicates a small blur amount. These matrices are calculated in advance on the basis of the point spread function of the image sensing lens. For example, assuming that the f-number of the image sensing optical system is F5.6, the matrix in FIG. 14A corresponds to F2.8, the matrix in FIG. 14B corresponds to F4.0, and these matrices can add the blur effects that cannot be realized by the image sensing optical system.

Let I(i, j) be image data of a pixel in the i-th row and j-th column of the region determined to be a portion other than the principal object, k be the row direction of the matrix shown in each of FIGS. 14A and 14B, l be the column direction, and Fil(k, l) be the matrix value in k-th row and l-th column using matrix numbers ranging from −4 to 4 shown in FIGS. 14A and 14B. Then, image data I(I, J) after blur addition is given by:

$$I(I, J) = \frac{\sum_{l=-4}^{4} \sum_{k=-4}^{4} (Fil(k, l) \cdot I(i-k, j-l))}{\sum_{l=-4}^{4} \sum_{k=-4}^{4} Fil(k, l)} \quad (7)$$

By repeating such calculation for all pixels of white blocks in FIG. 12, a background image can be effectively blurred. Furthermore, not only the image 211a but also the remaining images 211b, 211c, and 211d undergo similar processes.

Since two different filter matrices are prepared in this case, the photographer can selectively use them according to his or her favor. In the above example, the background undergoes the blur filter process using one filter. Alternatively, the background shown in the image deviation amount distribution map shown in FIG. 12 may be segmented in accordance with the image deviation amounts, and may undergo the blur filter processing a large number of filter matrices corresponding to distances estimated from these image deviation amounts. At this time, respective parameters of equations (5) are changed to increase change amounts of the image deviation amount depending on the distances even at relatively distant positions, thus easily segmenting the background in accordance with the image deviation amounts. However, in this embodiment, the background undergoes the blur filter process using only one filter in consideration of high-speed processes. Hence, the process of this embodiment is more effective for an image such as a portrait photo in which the distance between the principal object and background is large.

Figure 15:
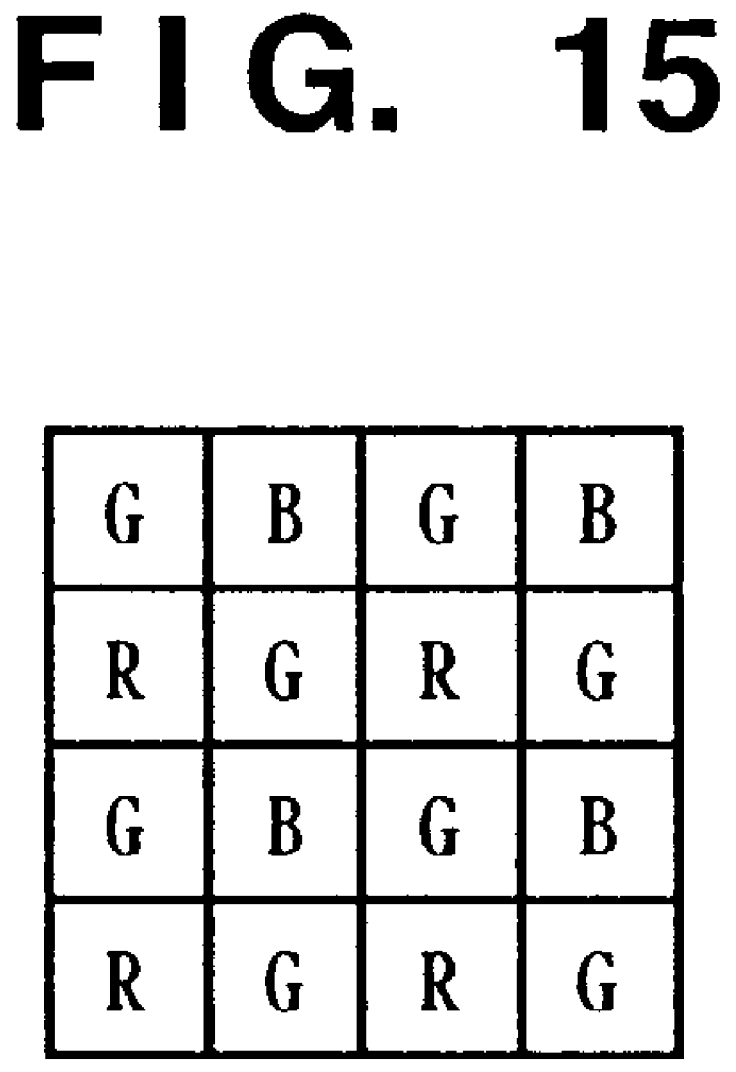

Finally, in step S310 a composite image is generated using the images 211a, 211b, 211c, and 211d. In this case, an image corresponding to a Bayer matrix based on pixel shift is generated. FIG. 15 partially shows a color filter matrix in a general Bayer matrix. In FIG. 15, R, G, and B respectively indicate red, green, and blue color filters. This filter matrix has a repetitive structure of four pixels, i.e., R, G, G, and B. In this embodiment, since the Bayer matrix based on pixel shift is used, a Bayer matrix image can be generated by embedding image data of the images 211b, 211c, and 211d between neighboring pixels of the image 211a. Hence, by rearranging the image data of the images 211a, 211b, 211c, and 211d, a Bayer matrix composite image can be generated.

The image processing method of this embodiment has been explained.

In the flow chart shown in FIG. 10, no image process is done for blocks in which calculation errors of image deviation amounts have occurred, and the flow jumps to the image composition process in step S310. However, most of such blocks in which calculation errors have occurred have low contrast, and no problem is posed in terms of image quality even when images of such blocks do not undergo any special process. For example, assume that some blocks of the principal object have caused calculation errors. The principal object undergoes the deviation correction image process to prevent color misregistration upon image composition, but color misregistration is nearly indistinctive due to low contrast without such process. Also, when some blocks of the background have caused calculation errors, they need not undergo a blur process due to low contrast. Because other background blocks undergo the blur image process, which means that an image is converted into a low-contrast image. By contrast, when such blocks that have caused calculation errors are separated into the principal object and background by some means, if they undergo wrong separation, opposite image processes are done, resulting in an unnatural image with low-image quality, which has no value as an image.

From those perspectives, in this embodiment, blocks in which calculation errors of image deviation amounts have occurred do not undergo any processes. In this manner, the processing algorithm can be simplified, and high-speed processes can be realized. Especially, in an apparatus which is mounted on, e.g., a mobile apparatus and comprises an image sensing unit that has a fewer number of pixels, includes a simple image sensing optical system, and has a relatively low resolution, differences between a portion which does not undergo any image process due to calculation errors, and that which has undergone the image process are nearly indistinctive. Therefore, this embodiment is more suitable for an apparatus with such image sensing unit. Note that the principal object and background may be completely separated using a known process such as grouping or the like, and blocks that have caused calculation errors may undergo some image processes.

The image processing method of the first embodiment has been explained. Image deviation amounts are calculated based on parallax images, the principal object undergoes a deviation correction image process to generate a high-quality image, and the background undergoes a blur image process to effectively add a blur effect, thus obtaining a high-quality image with a natural blur effect. Furthermore, even when an image includes blocks in which calculation errors of image deviation amounts have occurred, image quality can be prevented from deteriorating considerably.

Second Embodiment

The second embodiment relates to an image processing apparatus which integrally comprises the image sensing unit and image processing unit in the first embodiment. Note that parts denoted by the same reference numerals as those in the first embodiment are the same as those in the first embodiment.

Figure 16:
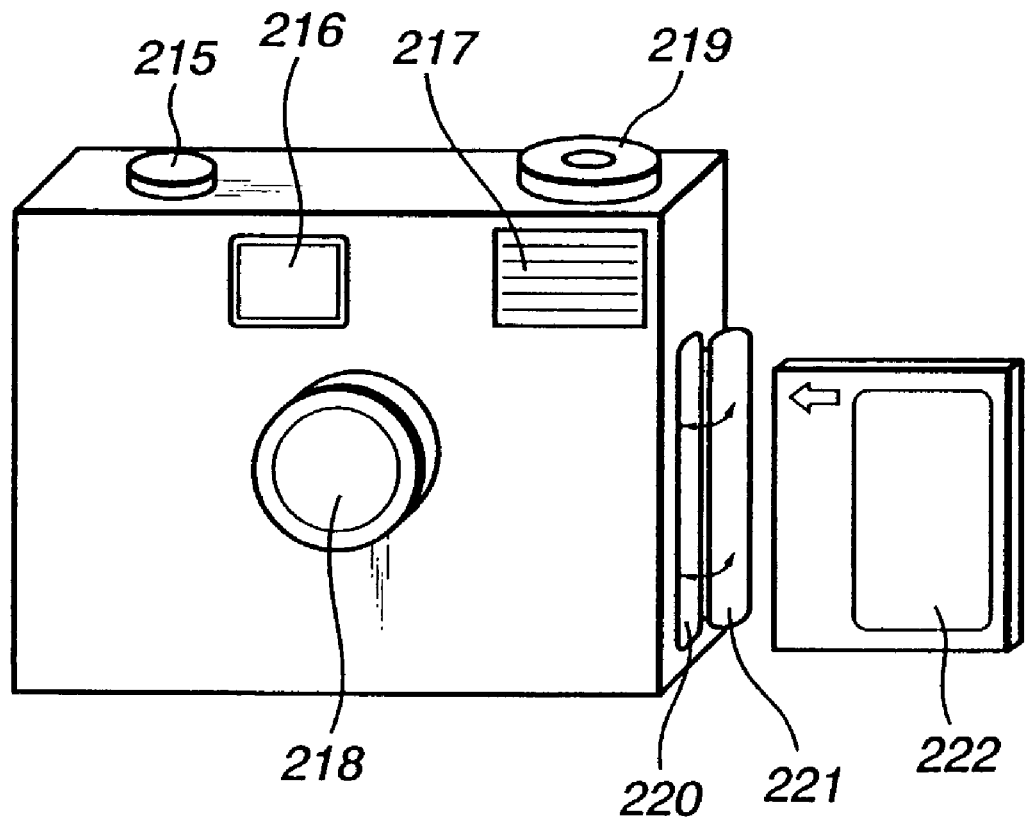
FIG. 16 is a perspective view of an image processing apparatus (digital camera) in the second embodiment.

FIG. 16 is a perspective view of the image processing apparatus of this embodiment, and a digital camera is used as the image processing apparatus. Referring to FIG. 16, reference numeral 215 denotes a photographing button. When the photographer presses this button, a photographing operation starts. Reference numeral 216 denotes an optical viewfinder; 217, an electronic flash; and 218, an image sensing unit protected by a plane-parallel glass, in which the image sensing unit 201 explained in the first embodiment is arranged. Since the arrangement of the image sensing unit is the same as that in the first embodiment, a description thereof will be omitted. Reference numeral 219 denotes a photographing mode setting member for setting various photographing modes. Reference numeral 220 denotes an external storage medium insertion slot, which is free to open/close by a lid 221. By inserting an external storage medium 222 into this external storage medium insertion slot, sensed images can be saved.

Figure 17:
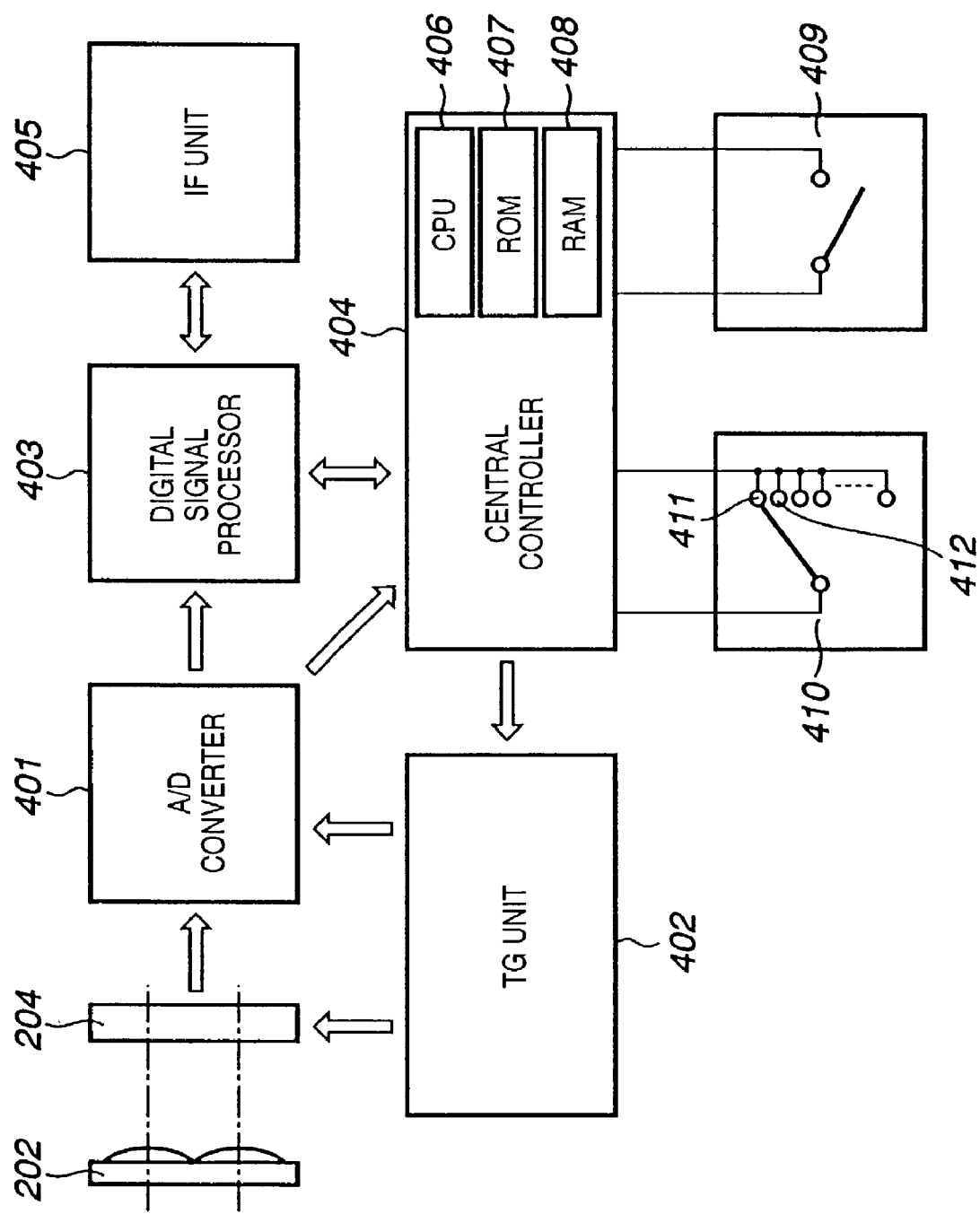
FIG. 17 is a block diagram of an electrical system in the image processing apparatus (digital camera)

FIG. 17 is a block diagram of an electrical system in the image processing apparatus shown in FIG. 16. The image processing apparatus comprises an image sensing unit which includes an image sensing lens 202 and image sensing element 204, which receives a block signal from a TG (timing generation) unit 402 and sends an analog image signal to an A/D converter 401. The A/D converter 401 converts the analog image signal into a digital image signal, which is sent to a digital signal processor 403. Furthermore, the digital signal processor 403 is connected to a central controller 404 and IF (interface) unit 405, and executes known image processes such as AE (Auto Exposure), AWB (Auto White Balance), gamma correction, image compression, and the like.

The IF unit 405 can connect an external storage medium or the like, and when the IF unit 405 connects the external storage medium 222 in FIG. 16, sensed image data can be stored.

The central controller 404 includes a CPU (central processing unit) 406 which makes various arithmetic operations, a ROM 407 which stores various operation programs, and a RAM 408 which temporarily holds a digital image signal. A photographing switch 409 and photographing mode setting switch 410 corresponding to the photographing button 215 and photographing mode setting member 219 in FIG. 16 are connected to the central controller 404. In this embodiment, when this photographing mode setting switch 410 is connected to a contact 411, an image process of the first embodiment (flow chart in FIG. 10) using the filter matrix of FIG. 14A is executed; when the switch 410 is connected to a contact 412, an image process of the first embodiment (flow chart in FIG. 10) using the filter matrix of FIG. 14B is executed. A photographing mode in which such process is executed will be referred to as a digital portrait mode hereinafter. When the switch 410 is connected to other contacts, one of photographing modes such as an auto photographing mode, macro mode, nightscape mode, and the like is selected and executed.

The arrangement of the image processing apparatus of the second embodiment, which is applied to, e.g., a digital camera, has been explained. An actual operation associated with the image process of this embodiment will be explained below using the flow chart in FIG. 18.

Figure 18:
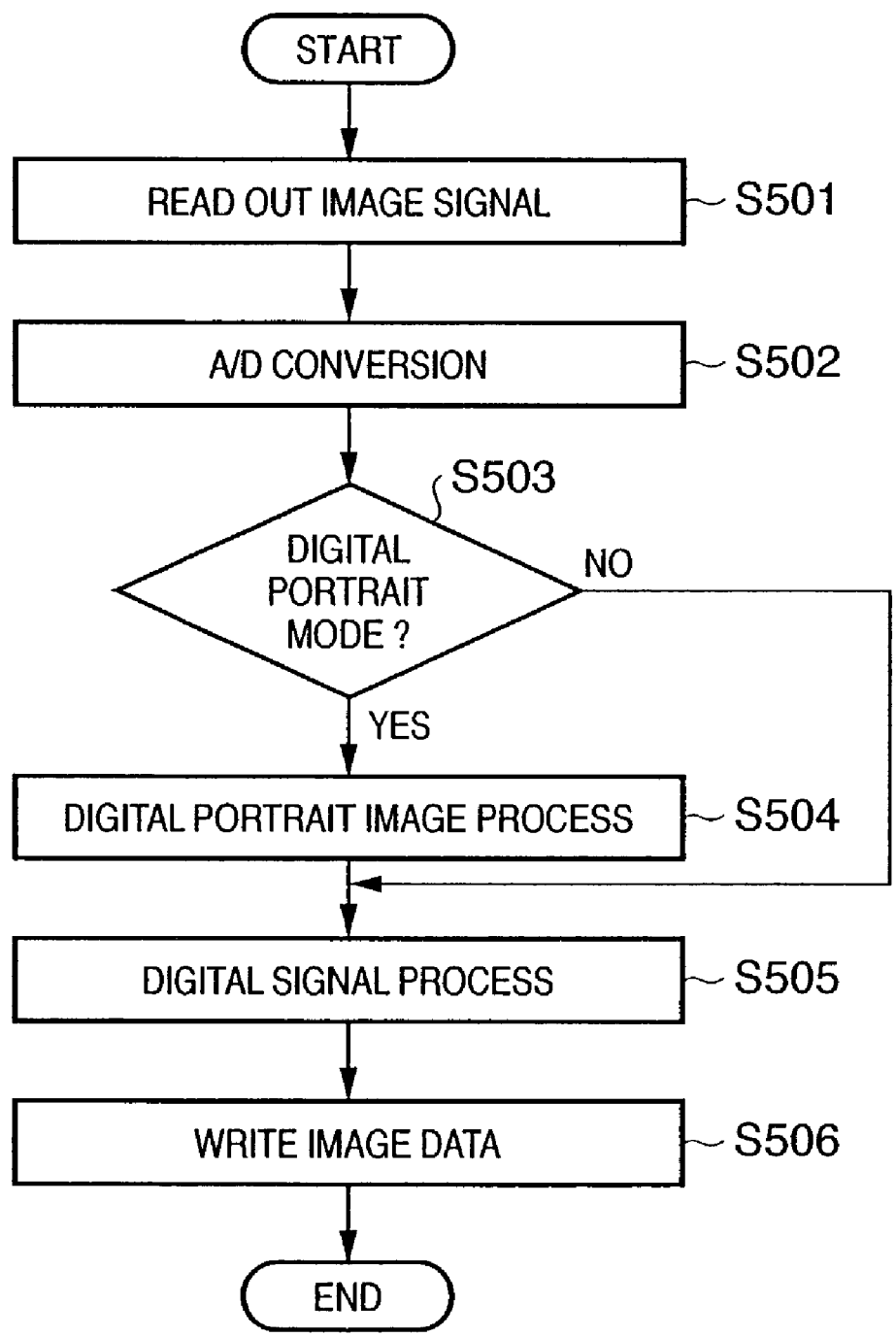
FIG. 18 is a flow chart showing the operation of the image processing apparatus (digital camera)
Figure 19:
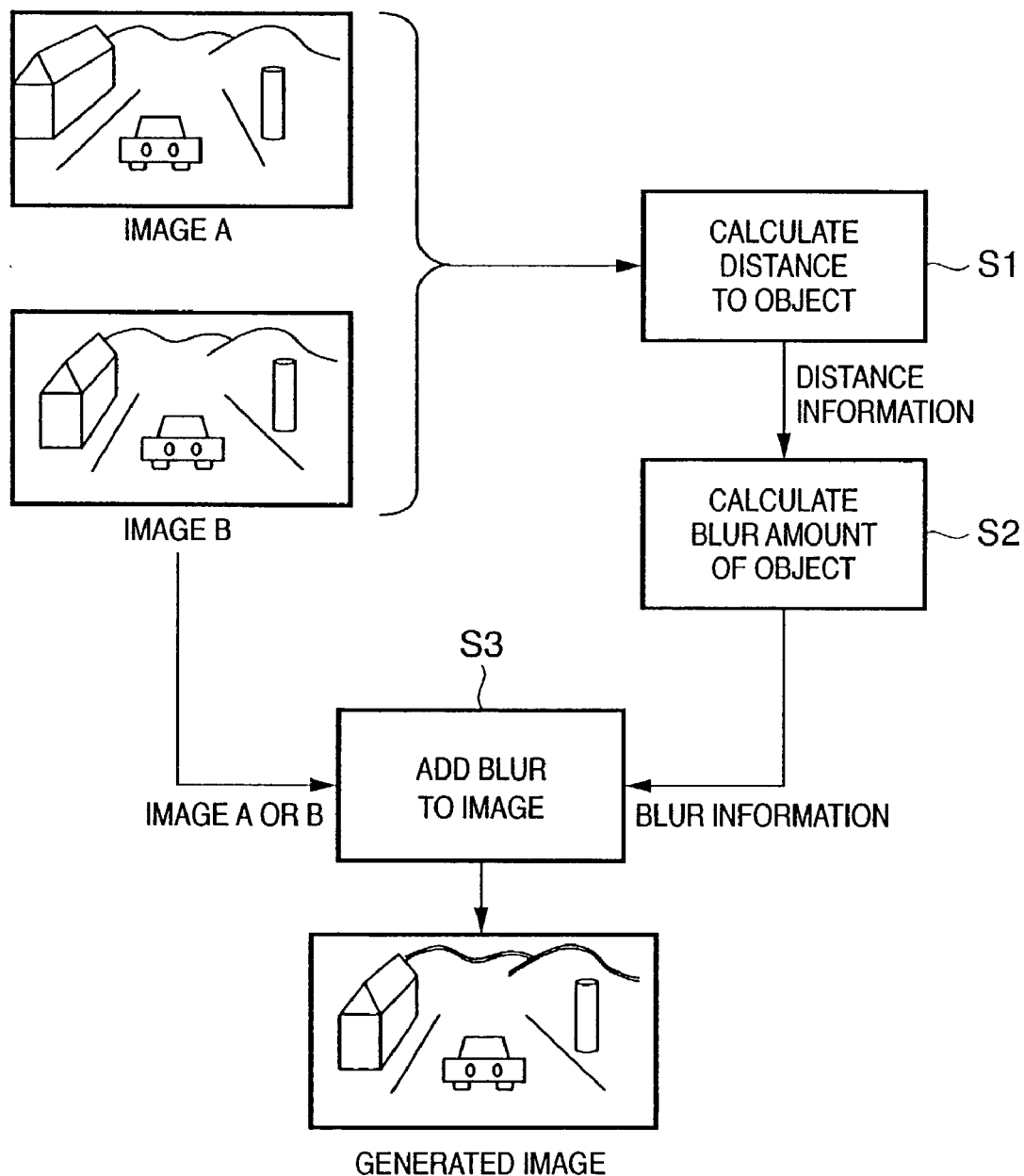
FIG. 19 shows a concept of a conventional image process.

FIG. 18 is a flow chart showing the operation of the digital camera in association with the image process of this embodiment. This flow chart is stored in the ROM 407 of the central controller 404 as a program.

In step S501, the digital signal processor 403 executes exposure operations such as AE, AWB, and the like in response to depression of the photographing button 215, and the TG unit 402 generates a clock signal based on the calculated values, thus making charge accumulation on the image sensing element 204 and reading out an analog image signal. The flow then advances to step S502.

In step S502, the A/D converter 401 converts the analog image signal into a quantized digital image signal.

It is checked in step S503 if the photographing mode setting switch 410 is set in the digital portrait mode. If the digital portrait mode is selected, a corresponding one of the filter matrices shown in FIGS. 14A and 14B is selected, and the flow advances to step S504. On the other hand, if the digital portrait mode is not selected, the flow jumps to step S505.

In a digital portrait image process in step S504, the flow chart of FIG. 10 in the first embodiment is executed. That is, the image is separated into the principal object and background, the principal object undergoes a deviation correction image process, and the background undergoes a blur image process.

In a digital signal process in step S505, the digital signal processor 403 executes known image processes such as a color process, gamma correction, and the like, and generates an image to be finally saved via an image compression process.

Finally, in an image data write process in step S506, the image to be saved is stored in the external storage medium via the IF unit 405.

The processing operation in the digital camera has been explained. In the above description, the digital portrait process in step S504 uses a digital image signal before the digital signal process of the digital signal processor 403 in step S505, i.e., a raw digital image signal immediately after A/D conversion. This is because image deviation amounts can be detected with higher precision when the raw digital image signal is used, as has also been explained in the first embodiment. Note that the order of steps S504 and S505 may be reversed. Furthermore, a raw digital image signal may be calculated back from the digital image signal that has undergone the digital signal process in step S505. However, since this embodiment adopts an irreversible image compression process, the aforementioned order is selected.

As described above, an example in which the image processing method explained in the first embodiment is applied to the digital camera has been described.

In this embodiment, the digital portrait image process is executed inside the digital camera. However, in order to improve the processing speed, when the digital portrait mode is selected, the digital camera may execute only normal digital image process without executing this image process and store, as additional information of an image, information indicating that the digital portrait mode has been selected, and the image may undergo an image process on an application of an apparatus such as a PC or the like which has a high-speed CPU. However, in this embodiment, the digital portrait image process is executed inside the digital camera to confirm the sensed image on a liquid crystal display (not shown) equipped on the back surface of the digital camera shown in FIG. 16.

Note that the present invention can be applied not only to the digital camera but also to other image processing apparatuses such as a digital video camera, scanner, and the like.

Also, a region of an image to which blur is added in the present invention may be obtained by combining a plurality of images or may use a single image.

Another Embodiment

The objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit.

When the present invention is applied to the storage medium, that storage medium stores program codes corresponding to the aforementioned flow charts (shown in FIGS. 1, 10, and 18).

As described above, according to the above embodiments, an image with a blur effect like that sensed by an image sensing lens with a large aperture size can be obtained from a plurality of parallax images sensed by an image sensing unit having an image sensing lens with a small aperture size.

Also, when pixel shift is applied to a plurality of parallax images, a higher-resolution image can be generated.

Furthermore, since blocks where calculation errors of disparities have occurred do not undergo any special image process, image quality can be prevented from deteriorating.

The present invention is not limited to the above embodiments and various changes and modifications can be made within the spirit and scope of the present invention. Therefore, to apprise the public of the scope of the present invention the following claims are made.

What is claimed is:

1. An apparatus comprising:
   (A) an input device that input a first image, and a second image which has parallax with respect to the first image; and
   (B) an image processing device that executes different image processes for first, corresponding regions of the first and second images input by said input device, and second regions thereof different from the first regions, and composite the first and second images,
   wherein the first regions are regions of a main object, and the second regions are regions of background scene, the first and second regions being determined by dividing the first and second images into a plurality of two dimensional areas and detecting image deviation between corresponding areas caused by the parallax between the first and second images and comparing the image deviation with a predetermined value, the first regions being regions where the image deviation is not less than the predetermined value, the second regions being regions where the image deviation is less than the predetermined value, and
   wherein said image processing device corrects image deviation between the first regions of the first and second images due to the parallax, and adds predetermined blur to the second regions of the first and second images, upon compositing the first and second images.

2. The apparatus according to claim 1, wherein said image processing device corrects image deviation between the first regions of the first and second images due to the parallax, and then composites the first and second images, wherein said image processing device adds predetermined blur to the second regions upon compositing the first and second images, and wherein said image processing device does not add the predetermined blur when an image deviation amount between the second regions of the first and second images due to the parallax is not more than a predetermined detection level.

3. The apparatus according to claim 1, wherein said image processing device determines the first and second regions on the basis of an image deviation amount between the first and second images due to the parallax.

4. The apparatus according to claim 1, wherein said apparatus includes an image sensing device.

5. The apparatus according to claim 1, wherein said apparatus includes a camera.

6. A method comprising:
   (A) the input step of inputting a first image, and a second image which has parallax with respect to the first image; and
   (B) the image processing step of executing different image processes for first, corresponding regions of the first and second images input in the input step, and second regions thereof different from the first regions, and compositing the first and second images,
   wherein the first regions are regions of a main object, and the second regions are regions of background scene, the first and second regions being determined by dividing the first and second images into a plurality of two dimensional areas and detecting image deviation between corresponding areas caused by the parallax between the first and second images and comparing the image deviation with a predetermined value, the first regions being regions where the image deviation is not less than the predetermined value, the second regions being regions where the image deviation is less than the predetermined value, and
   wherein said image processing step includes the step of correcting image deviation between the first regions of the first and second images due to the parallax, and adding predetermined blur to the second regions of the first and second images, upon compositing the first and second images.

* * * * *